United States Patent

Harman

[11] 4,097,697
[45] Jun. 27, 1978

[54] DIGITAL SIGNAL PERFORMANCE MONITOR

[75] Inventor: Stephen George Harman, Ottawa, Canada

[73] Assignee: Northern Telecom Limited, Montreal, Canada

[21] Appl. No.: 802,376

[22] Filed: Jun. 2, 1977

[51] Int. Cl.² ............................................. H04B 3/46
[52] U.S. Cl. ............................ 179/175.3 R; 324/57 N
[58] Field of Search ............... 179/175.3 R, 175.31 R, 179/15 BF; 325/41; 324/57 N, 57 DE, 57 PS; 178/69 A; 328/164

[56] References Cited

U.S. PATENT DOCUMENTS

| | | | |
|---|---|---|---|
| 3,873,775 | 3/1975 | Chown | 179/15 BF |
| 3,906,174 | 9/1975 | Dotter | 179/175.3 R |
| 4,001,525 | 1/1977 | Edwards | 179/175.31 R |
| 4,053,723 | 10/1977 | Arras et al. | 179/175.3 R |

*Primary Examiner*—Douglas W. Olms
*Attorney, Agent, or Firm*—John E. Mowle

[57] ABSTRACT

A performance monitor for determining the error density of a digitally transmitted signal in which the magnitude of a d-c offset voltage applied to one regenerator is controlled in a feedback loop so as to maintain a constant error rate between the output of it and another regenerator; the magnitude of the voltage being a measure of the degradation of the received signal and hence its error density.

4 Claims, 4 Drawing Figures

DIGITAL SIGNAL PERFORMANCE MONITOR

This invention relates to a circuit for monitoring the degradation of a digitally transmitted signal and more particularly to one which is capable of a direct indication of very low error densities in the regenerated signal.

BACKGROUND OF THE INVENTION

During transmission, a binary signal suffers degradation from such factors as intersymbol interference, random noise, tonal interference and distortion. Consequently, a number of errors will develop during regeneration as a result of an incorrect decision being made in the regenerator. Since such errors are normally randomly distributed throughout the pulse train, it is possible to statistically determine the number of errors being generated by the transmission system by periodically transmitting a known digit of a unique sequence and conducting a parity check at the receiving terminal. To conduct such parity checks however, requires that the transmitted signal be completely demodulated down to baseband in order to extract the known digits, and then to compare them against a known sequence of the same digits in order to derive the number of errors introduced by the transmission system. Alternately, if duobinary or level coded correlative transmission is utilized, a check for violations in the predetermined rules of the correlated pulse train can be made to determine errors. This is described in an article entitled: "Faster Digital Communications With Duobinary Techniques" by Adam Lender, Electronics, Mar. 22, 1963, pp. 61–65. Again however, parity checking on a bit-by-bit basis of the signal is required.

A study concerned with monitoring the performance of such a system is described in an article by Benjamin J. Leon et al. entitled: "A Bit Error Rate Monitor for Digital PSK Links." Here, the monitoring method is based on the use of an artificial threshold for the decision variable and the generation of a measurable "pseudoerror." Another article dealing with the quality of service in digital transmission systems is one by G. S. Fang, entitled: "Alarm Statistics of the Violation Monitor and Remover," BSTJ, Oct. 1976, pp. 1197–1217.

In a typical digital radio system, employing a large number of relays located at relatively short distances compared to the overall length of the system, this requirement to completely parity check the baseband signal in order to determine the quality of the system along each hop of the network is relatively expensive. Thus, while it may be economically feasible to provide such a counter at each major terminal of the network, such counters are not considered viable at each relay along the transmission path. It is, however, still desirable to monitor the performance of each radio hop in order that trouble on the system can be readily located. A similar problem also exists in a cable transmission system of digital information with the exception that the introduction of errors results solely from deterioration of the equipment and not from fading along the transmission path.

STATEMENT OF THE INVENTION

It has been discovered that an adaptive degradation of the binary signal prior to regeneration can be utilized in conjunction with a closed and constant error-rate feedback loop to realize a performance monitor which is simple and yet capable of direct indications of very low error densities.

Thus, in accordance with the present invention there is provided a performance monitor for a degraded digital signal which comprises: regenerators for regenerating the degraded digital signal and the degraded digital signal offset against a d-c voltage. In addition the monitor includes a comparator for detecting parity errors in the digital state between the two regenerated digital signals; and a negative feedback circuit, responsive to the output of the comparator, for varying the magnitude of the d-c voltage in such a direction as to maintain a substantially constant error rate between the two regenerated digital signals. The magnitude of this d-c voltage is then a measure of the degradation of the incoming digital signal and hence the error density introduced by the system. This d-c voltage is proportional to one point on the probability distribution function of the restored linear (unregenerated) signal.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
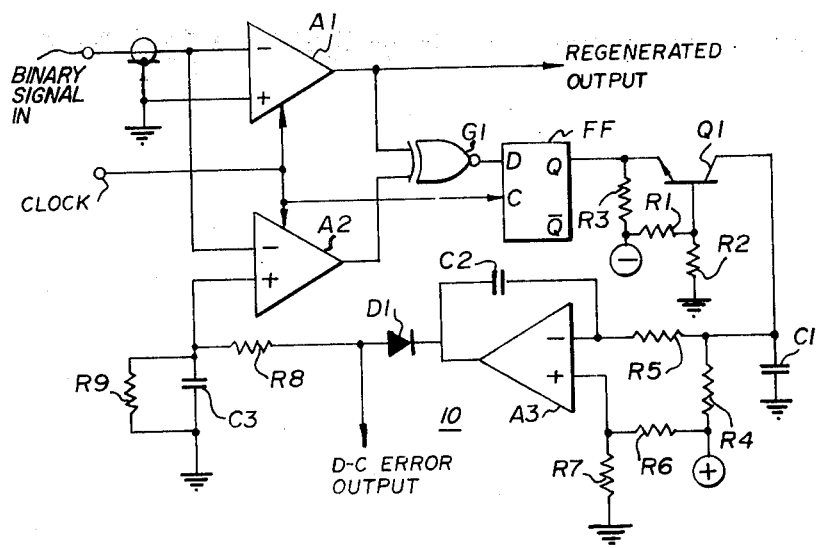
FIG. 1 is a schematic circuit diagram of a performance monitor in accordance with the present invention.

Referring to FIG. 1, the performance monitor comprises a pair of regenerators consisting of differential amplifiers A1 and A2, the outputs of which are connected to a parity comparator consisting of an exclusive —NOR gate G1. Amplifier A1 functions as the primary or main regenerator thereby providing the regenerated binary output signal at its output, while amplifier A2 functions as the secondary or pseudo-error regenerator. The output of the gate G1 is fed to the input of a negative feedback loop, generally 10, which controls the magnitude of a d-c offset voltage fed to regenerator A2. The detailed structure of the performance monitor will be readily apparent from the following description of the function and operation of the various elements therein. In this description, the error density or error rate of the regenerated binary signal refers to the ratio of error bits to the total number of transmitted bits resulting from decision errors introduced in the regenerator of the receiver. This ratio which is normally very low, will increase dramatically during severe fading of the transmitted signal or deterioration of the transmitting and/or receiving equipment. It is to be distinguished from the loop error rate or loop error density which is the ratio of the error bits to the total number of transmitted bits at the output of the regenerator A2. This ratio is set by design parameters of the feedback loop 10 and remains substantially constant during changes in the error rate of the regenerated signal. However as explained hereinafter, the d-c offset or error voltage in the loop will vary during degradation of the incoming binary signal so as to maintain this loop error rate constant.

In operation, a non-regenerated binary signal, such as from the demodulator of a digital radio system, is connected in-phase to both the "−" inputs of the regenerators A1 and A2 which are both clocked in parallel from a recovered clock source in the demodulator (not shown). Regenerator A1 has its "+" input connected to ground while regenerator A2 has its "+" input connected to a source of variable d-c offset voltage.

Figure 2:
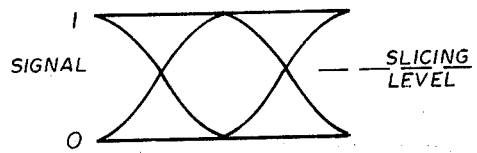
FIG. 2 is an eye pattern of an idealized binary signal.
Figure 3:
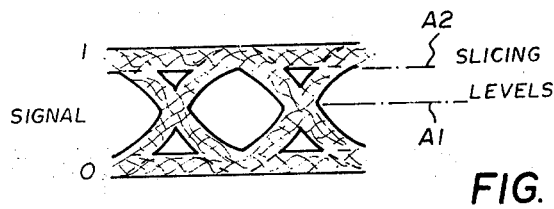
FIG. 3 is a typical eye pattern of a received binary signal having intersymbol interference.

A received binary signal at the input to the monitor, can be viewed as having an idealized eye pattern as shown in FIG. 2. The concept of the eye pattern is discussed at length in an article entitled: "Correlative Level Coding For Binary-Data Transmission" by Adam Lender, IEEE Spectrum, February 1966, pp. 104–115. However, due to band limitations on the transmitted signal and other degradations introduced by the system, a typical eye pattern of a non-faded signal coupled to the input of the performance monitor, is as shown in FIG. 3. Thus, it is important to note that partial closure of the eye is observed even under ideal transmitting conditions due to normal degradation of the signal introduced by design limitations in the system. Since the signal is relatively symmetrical, the slicing level of regenerator A1 falls midway between the "0" and "1" levels. On the other hand, due to the offset voltage coupled to the "+" input of regenerator A2, the slicing level under normal conditions is offset as shown in FIG. 3. As will be explained in detail hereinafter, this level is set by the negative feedback loop 10 to generate a predetermined bit error rate at the input to the exclusive -NOR gate G1.

With the slicing level of regenerator A2 set as shown, parity between the regenerated signals is normally achieved at the outputs of the two regenerators A1 and A2. As a result, the output of the exclusive -NOR gate G1 is normally held high. This generates a "1" at the Q output of the D-type flip-flop FF when gated by the clock input. Transistor Q1 is biased OFF whenever the Q output of the flip-flop is a "1." Consequently during this time, no current flows from the negative source of voltage through the transistor Q1.

Due to the random distribution of noise on the binary input signal and the offset voltage applied to regenerator A2, parity violations or non-coincidence between the two signals will occur a small proportion of the time. This causes the output of the exclusive NOR gate G1 to go low which in turn causes the Q output of the flip-flop also to go low (i.e., more negative than the bias voltage on the base of transistor Q1 which is set by bias resistors R1 and R2). At this point, transistor Q1 is turned ON and current flows from the negative source of voltage through a resistor R3 and transistor Q1 into a capacitor C1. Capacitor C1 in conjunction with a resistor R4 forms a preintegration circuit whose function is to average the pulses sufficiently from transistor Q1 to prevent the slew rate of the following differential amplifier A3, being exceeded.

The output from the preintegrator is then fed to the main integrator comprising a resistor R5 and a capacitor C2 in conjunction with the differential amplifier A3. The output voltage from the amplifier A3 is determined by the bias on its "+" input which in turn is set by the voltage divider comprising resistors R6 and R7 connected between the positive source of voltage and ground. The output of the differential amplifier A3 is coupled through a diode D1 which is used to prevent reversal of the d-c offset voltage during start-up of the circuit. The output of the diode D1 produces the error d-c output which, as will be explained hereinafter, provides a measure of the system performance. The d-c output voltage from the diode D1 is coupled through a voltage divider comprising resistors R8, R9 and a smoothing capacitor C3 to the "+" input of the regenerator A2. Due to negative feedback within the loop 10, the bias voltage at the input to regenerator A2, moves in a direction to establish a constant error rate at the input to the flip-flop FF. This bit error rate is predominately set by the ratio of the currents through resistors R3 and R4. In a typical application the peak current ratio is $(3.3 \times 10^3):1$ yielding a loop error rate which is the reciprocal thereof, i.e., $3 \times 10^{-4}$. As can be seen from the slicing levels in FIG. 3, only half-wave detection is used. This however is an accurate reflection of one-half the total number of errors developed in the regenerator because the received binary signal is symmetrical.

In a typical high capacity digital system, a 45 megabit signal is transmitted over the radio transmission system. In order to conserve spectrum bandwidth, the transmit signal is band limited in the transmitter. With additional noise and distortion generated in the balance of the system, the eye pattern of an idealized (i.e., unfaded) received signal is similar to that shown in FIG. 3. This signal is considered to be substantially error free with a bit error rate in the regenerated signal of $<<1 \times 10^{-16}$. Such bit error rates are extremely difficult to monitor directly since the errors are so widely spaced in time. However, during a severe fade of the transmitted radio signal, the bit error rate can readily climb to $>1 \times 10^{-4}$.

Referring again to FIG. 3, it can be seen that the offset voltage applied to the "+" input of regenerator A2 causes its slicing level to differ from that of regenerator A1. As noise and/or distortion on the system increases, the signal will suffer greater perturbations, and the magnitude of the eye opening will be seen to decrease. Since the negative feedback loop 10 attempts to maintain a constant bit error rate at the input to the exclusive-NOR gate G1, the magnitude of the d-c offset or error voltage will decrease with increasing noise so that the slicing level of regenerator A2 moves towards that of regenerator A1. This decrease in d-c error voltage is therefore a measure of the magnitude of the eye opening which in turn can be directly correlated with error densities at the input to the monitor, although it does not directly detect individual errors.

Figure 4:
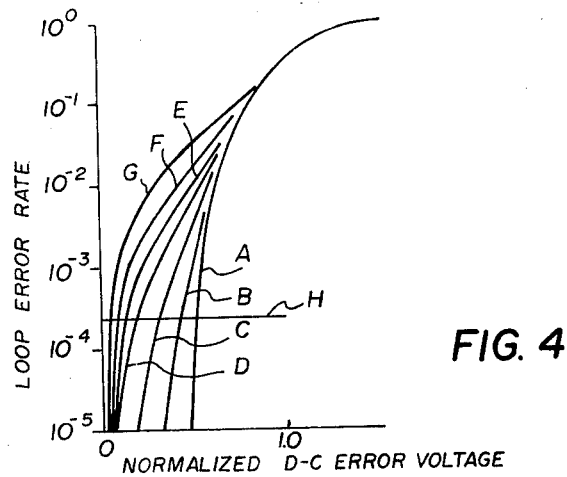
FIG. 4 shows typical curves of loop error rates vs d-c error voltage for various fade conditions of the incoming signal.

Typical curves of error density at the output of the flip-flop FF vs the corresponding output d-c error voltage, are shown in FIG. 4. When the loop error rate is high $>10^{-2}$, the d-c error voltage at the output of the monitor is dominated by peak limited intersymbol interference distribution (as indicated by the converging of the curves towards the top of the graph). On the other hand at low loop error rates $<10^{-5}$ a point far down the noise distribution curve is being monitored which is dominated by gaussian interference (as indicated by crowding towards the lower left portion of the graph). In the initial application, optimum performance of the monitor occurred with loop error rates between $10^{-3}$ and $10^{-4}$.

Curve A of FIG. 4 illustrates the normalized error voltage when the feedback loop is set for various loop error rates with an idealized received signal (one in which virtually no decision errors are made in the regenerator A1). Curve G illustrates the normalized error voltage for various loop error rates of a received signal which has an error density of about $10^{-3}$. Such a signal would be experienced during a deep fade of the transmitted radio signal. The other curves B - F illustrate the normalized error voltage for binary signals between the two extremes shown in curves A and G. This set of curves A - G is typical of those which would be obtained for flat gaussian noise interference on the received signal. Tonal or monotonic generated interference will cause the entire set of curves to shift towards the left, while impulse noise will cause only the lower portions of those curves to shift slightly to the left.

The intersection of the curves A - G with the horizontal line H illustrates the normalized d-c error voltage at the output of the monitor, with a selected loop error rate of $3 \times 10^{-4}$. This error voltage can be readily translated into error density on the regenerated binary signal for gaussian interference. Typical error densities which would be monitored are shown in the following table:

| Intersection of Curves With Line H (loop error rate $3 \times 10^{-4}$) | Normalized D-C Error Voltage | Regenerated Binary Signal Error Density |
|---|---|---|
| A | 0.50 | $>>10^{-16}$ |
| B | 0.40 | $1 \times 10^{-12}$ |
| C | 0.30 | $1 \times 10^{-8}$ |
| D | 0.20 | $1 \times 10^{-6}$ |
| E | 0.12 | $1 \times 10^{-4}$ |
| F | 0.08 | $3 \times 10^{-4}$ |
| G | 0.05 | $1 \times 10^{-3}$ |

It will be evident that this performance monitor measures the change in eye opening caused by changes in the probability function, and does not count the errors directly. However, such a check is a relatively accurate indication of the overall performance of the system.

The above table illustrates that there is meaningful variation in the d-c error voltage at extremely low error rates where the system normally operates. In addition, the monitor responds very rapidly to sudden increases in error density because the whole digital pulse stream is being monitored rather than only a sample portion as in the parity checkers or error counters of the prior art. Also the feedback loop is non-linear as to rate of change of d-c error voltage with respect to time. Thus any sudden increase in the error density of the incoming pulse stream will cause a large number of parity violations to develop at the output of the comparator until the system restabilizes at the loop error rate. In general therefore the performance monitor will indicate the error density much quicker than an error counter which must average the results over a period of time in order to determine the true error density.

What is claimed is:
1. In a performance monitor for a degraded digital signal, an error voltage output circuit comprising:
   regenerators for regenerating the degraded digital signal and the degraded digital signal offset against a d-c voltage;
   a comparator for detecting parity errors in the digital state between the two regenerated digital signals;
   a negative feedback circuit, responsive to the number of parity errors at the output of the comparator, for varying the magnitude of said d-c voltage to maintain a substantially constant error rate between the two regenerated digital signals; and
   output means for the d-c voltage;
   whereby the magnitude of the d-c voltage is a measure of the degradation of the digital signal and hence the error density.

2. In a performance monitor for a degraded binary signal, an error voltage output circuit comprising:
   a first regenerator for regenerating the degraded binary signal;
   a second regenerator for regenerating the degraded binary signal offset against a variable d-c voltage;
   a gate, for generating an output for each parity error in the binary states between the regenerated signals from the first and second regenerators;
   a negative feedback circuit responsive to said output of said gate for controlling the magnitude of the variable d-c voltage to maintain the rate of parity errors between the regenerated signals substantially constant; and
   output means for the d-c voltage;
   whereby the magnitude of the d-c voltage is a measure of the degradation of the binary signal and hence the number of decision errors generated by the first regenerator.

3. A performance monitor as defined in claim 2 in which the negative feedback circuit includes a current generator;
   means for gating the current generator on in response to an output from said gate;
   means for integrating the output from the current generator to derive said variable d-c voltage.

4. A performance monitor as defined in claim 3 in which each of the regenerators is an overdriven differential amplifier having the degraded digital signal coupled directly between inputs of the first regenerator, and coupled in series with the variable d-c voltage between the inputs of the second regenerator.

* * * * *